(12) United States Patent
Fisser (10) Patent No.: US 10,259,042 B2
(45) Date of Patent: Apr. 16, 2019

(54) DEVICE AND METHOD FOR THE MANUFACTURE OR REPAIR OF A THREE-DIMENSIONAL OBJECT

(71) Applicant: MTU Aero Engines AG, Munich (DE)

(72) Inventor: Maximilian Fisser, Tegernsee (DE)

(73) Assignee: MTU Aero Engines AG, Munich (DE)

( * ) Notice: Subject to any disclaimer, the term of this patent is extended or adjusted under 35 U.S.C. 154(b) by 601 days.

(21) Appl. No.: 15/003,884

(22) Filed: Jan. 22, 2016

(65) Prior Publication Data

US 2016/0214173 A1   Jul. 28, 2016

(30) Foreign Application Priority Data

Jan. 28, 2015 (DE) .................. 10 2015 201 425

(51) Int. Cl.
| | |
|---|---|
| *B22F 3/10* | (2006.01) |
| *B22F 3/105* | (2006.01) |
| *B23K 26/342* | (2014.01) |
| *B23P 6/00* | (2006.01) |
| *B29C 64/153* | (2017.01) |
| *B22F 7/06* | (2006.01) |
| *B33Y 10/00* | (2015.01) |

(Continued)

(52) U.S. Cl.
CPC .......... *B22F 3/1007* (2013.01); *B22F 3/1055* (2013.01); *B23K 26/342* (2015.10); *B23P 6/007* (2013.01); *B29C 64/153* (2017.08); *B22F 2003/1056* (2013.01); *B22F 2007/068* (2013.01); *B23K 2101/001* (2018.08); *B33Y 10/00* (2014.12); *B33Y 30/00* (2014.12); *Y02P 10/295* (2015.11)

(58) Field of Classification Search
None
See application file for complete search history.

(56) References Cited

U.S. PATENT DOCUMENTS

| | | |
|---|---|---|
| 5,304,329 A | 4/1994 | Dickens et al. |
| 2006/0214335 A1 | 9/2006 | Cox |

(Continued)

FOREIGN PATENT DOCUMENTS

| | | |
|---|---|---|
| DE | 102009051479 A1 | 5/2011 |
| DE | 102010020416 A1 | 11/2011 |
| DE | 102010052206 A1 | 5/2012 |

(Continued)

*Primary Examiner* — Colin W. Slifka
(74) *Attorney, Agent, or Firm* — Barlow, Josephs & Holmes, Ltd.

(57) ABSTRACT

The invention relates to a device for the manufacture or repair of a three-dimensional object, comprising at least one construction chamber for a successive solidification of at least one solidifiable material layer by layer in predefined regions for layer-by-layer buildup of the three-dimensional object or for layer-by-layer repair of individual regions of the three-dimensional object inside of the construction chamber, at least one coater that can travel for deposition of the material on at least one buildup and joining zone of a construction platform formed in the construction chamber, at least one inflow nozzle and at least one suction outlet nozzle for a process gas, with the inflow nozzle and the outlet nozzle being arranged in such a way that a gas flow that passes at least partially above the buildup and joining zone is created, and at least one overflow tank.

13 Claims, 4 Drawing Sheets

(51) Int. Cl.
*B33Y 30/00* (2015.01)
*B23K 101/00* (2006.01)

(56) References Cited

U.S. PATENT DOCUMENTS

2016/0136731 A1* 5/2016 McMurtry .............. B29C 64/20
  419/53
2017/0120330 A1* 5/2017 Sutcliffe ............... B22F 3/1055

FOREIGN PATENT DOCUMENTS

| | | | |
|---|---|---|---|
| DE | 102011088158 A1 | 6/2013 | |
| DE | 102012008664 A1 | 11/2013 | |
| WO | 2005025780 A1 | 3/2005 | |

\* cited by examiner

DEVICE AND METHOD FOR THE MANUFACTURE OR REPAIR OF A THREE-DIMENSIONAL OBJECT

BACKGROUND OF THE INVENTION

The invention relates to a device for the manufacture or repair of a three-dimensional object. The invention further relates to a method for the manufacture or repair of a three-dimensional object as well as gas conduction devices for use in a device for the additive manufacture or repair of a three-dimensional object.

Methods and devices for the manufacture of three-dimensional objects, in particular components, are known in great variety. In particular, additive fabrication methods (so-called rapid manufacturing or rapid prototyping methods) are known in which the three-dimensional object or the component is built up layer by layer by means of additive fabrication methods based on powder beds. Primarily metal components can be manufactured, for example, by laser or electron beam melting or sintering methods. In these processes, at least one powdered component material is initially deposited layer by layer on a construction platform in the region of a buildup and joining zone of the device. Afterward, the component material is locally melted and/or sintered layer by layer by means of supplying at least one high-energy beam, such as, for example, an electron or laser beam, in the region of the build-up and joining zone. In this process, the control of the high-energy beam depends on information about the layer of each component layer being produced. After the melting and/or the sintering, the construction platform is lowered layer by layer by a predefined layer thickness. Afterward, the steps mentioned are repeated until the component has been completely fabricated. Comparable additive methods are known for the manufacture of ceramic or plastic elements.

Also known from prior art are, in particular, additive manufacturing methods for the manufacture of components of a turbomachine, such as, for example, components of an aircraft engine or a gas turbine—for example, the method or a corresponding device for the manufacture of a component of a turbomachine described in DE 10 2009 051 479 A1. In this method, a corresponding component is manufactured by deposition of at least one powdered component material layer by layer on a construction platform in the region of a buildup and joining zone as well as local melting or sintering of the component material layer by layer by means of energy supplied in the region of the buildup and joining zone. The supply of energy occurs in this process via laser beams, such as, for example, $CO_2$ lasers, Nd:YAG lasers, Yb fiber lasers, as well as diode lasers, or by electron beams.

The removal of process by-products is usually implemented in the generic devices and methods by a flow of protective gas, which is generally passed over the mentioned component platform or a buildup and joining zone. In this process, known devices for the additive fabrication of three-dimensional objects comprise a plurality of inlet nozzles for the protective gas as well as at least one suction outlet nozzle. Used, in particular, are inlet and outlet nozzles that are arranged laterally in an opposite-lying manner above the buildup and joining zone in the construction chamber or process chamber. In this case, it is advantageous when the flow of protective gas is passed homogeneously above the construction platform in regard to flow direction and flow rate. However, in the construction chamber or the process chamber, there are two prominent components that influence this homogeneity. There is, on the one hand, the overflow component for collecting excess material and, on the other hand, the coating component or coater itself. These two components have a negative influence on the flow direction and flow rate of the flow of protective gas. In particular, vortexing of the flow of protective gas on the coater and a drop in the flow in the direction of the overflow tank can occur. This leads to a deficient removal of process by-products of additive fabrication methods. Thus, for example, in known devices for selective laser beam melting, an increase in flaws occurs in certain regions of the construction chamber in the process and in the component, so that these regions have to be blocked for the production of components in series. These flaws occur, in particular, on account of the mentioned deficient removal of process by-products. The process by-products in selective laser beam melting can be, in particular, smolder (welding fumes), spatter, ejected material, and dispersed powder. Smolder, in particular, leads to defocusing and shielding of the laser beam. As a result, the energy density that needs to be introduced onto the melting material drops and the powder is melted only deficiently. This leads to deficient bonding to the component, as a result of which, in turn, bonding flaws can occur in the component. In addition, spatter and ejected material lead to a marked local increase in the layer thickness. As a result, deficient bonding to the component and bonding flaws, in turn, can occur.

SUMMARY OF THE INVENTION

The object of the present invention is therefore to create a device and a method of the kind mentioned in the introduction, which ensures an improved removal of the process by-products formed in additive fabrication methods from a region of a buildup and joining zone. In addition, there is the object of creating gas conduction devices that also ensure an improved removal of process by-products formed in additive manufacturing methods from a region of a buildup and joining zone of a device for the additive manufacture or repair of a three-dimensional object.

This object is solved according to the invention by a device for the manufacture or repair of a three-dimensional object as well as a method in accordance with the present invention. In addition, these objects are achieved by gas conduction devices of the present invention. Advantageous embodiments with appropriate enhancements of the invention are presented in detail below, in which advantageous embodiments of the device are to be regarded as advantageous embodiments of the method as well as of the gas conduction devices and vice versa.

A first aspect of the invention relates to a device for the manufacture or repair of a three-dimensional object, said device comprising at least one construction chamber for successive solidification of at least one solidifiable material layer by layer in predefined regions for layer-by-layer buildup of the three-dimensional object or for layer-by-layer repair of individual regions of the three-dimensional object inside of the construction chamber, at least one traveling coater for deposition of the material on at least one buildup and joining zone of a construction platform formed in the construction chamber, at least one inlet nozzle as well as at least one outlet nozzle for a process gas, with the inlet nozzle and the outlet nozzle being arranged in such a way as to create a flow of gas that passes at least partially above the buildup and joining zone, and at least one overflow tank. The device according to the invention comprises at least one gas conduction device that is movably arranged inside of the construction chamber, with said gas conduction device being arranged in such a way that the coater and/or the overflow tank are or is shielded from the flow of gas at least temporarily when the gas conduction device is in a closed position. Owing to the arrangement of the gas conduction device according to the invention, it is possible to shield at least two device components, namely, the coater and the overflow tank, each at least temporarily from the flow of gas passing above the buildup and joining zone. Accordingly, the gas conduction device serves advantageously for optimizing the guidance of the flow in the construction chamber or process chamber of the device. The negative influence of the overflow tank and/or of the coater on the flow of gas is markedly reduced. In this way, more homogeneous flow directions and flow rates of the gas flow in the construction chamber of the device are obtained, so that there results an improved removal of the process by-products formed during additive fabrication methods from the region of the buildup and joining zone. It is thereby possible to improve markedly the fabrication quality of the three-dimensional objects being manufactured or the quality of a corresponding repair of three-dimensional objects.

In an advantageous embodiment of the invention, the movement of the gas conduction device in the device according to the invention is provided by means of the coater or by means of a drive unit. If the coater is used for movement of the gas conduction device, it is possible to dispense with additional drive means. However, it is also possible for the gas conduction device to be moved and controlled by means of a drive unit, such as, for example, a motor, in particular an electric motor or via a torsion spring.

In other advantageous embodiments of the device according to the invention, the gas conduction device is designed in the form of a blade wheel with at least three blade elements and is arranged in a region above the overflow tank so as to rotate by means of a drive unit or else is arranged in a region above the overflow tank in a rotatable manner in such a way that, when the coater travels over the gas conduction device, the coater comes in contact with at least a portion of the blade elements and causes the gas conduction device to move in such a way that it remains at least temporarily in the closed position. The design of the gas conduction device according to the invention in the form of a blade wheel has the effect that the overflow tank is isolated nearly without exception from the flow of gas by means of the blade elements. Any overflow of the flow of gas into the overflow tank is reliably prevented. In addition, in a position of travel above the overflow tank, the coater is also reliably shielded from the flow of gas above the buildup and joining zone by at least one blade element. The homogeneity of the flow direction and the flow rate of the gas flow above the buildup and joining zone is markedly improved. In addition, there exists the possibility that at least one blade element is designed in such a way that one end of the blade element abuts an edge of the overflow tank and/or the buildup and joining zone and/or a support region between the construction platform and the overflow tank and at least the overflow tank is thereby shielded from the flow of gas by means of the abutting blade element and the at least one non-abutting blade element. The possibility of abutting a blade element against the edge of the overflow tank and/or the buildup and joining zone and/or the mentioned support region reliably prevents the flow of gas from flowing out into the overflow tank, so that, in turn, the homogeneity of the flow direction and the flow rate of the gas flow above the buildup and joining zone is markedly improved. Furthermore, there exists the possibility that the gas conduction device comprises three blade elements, with the blade elements being arranged at an angle of 120° with respect to one another. In addition, there exists the possibility that at least one blade element is designed to be heavier than the other blade elements and/or that an axis of rotation of the gas conduction device is arranged eccentrically with respect to an intersection of the blade elements. The advantageous latter-mentioned measure ensures that the respective blade elements stably abut the edge of the overflow tank, the buildup and joining zone, or the mentioned support region between the construction platform and the overflow tank and reliably shield the flow of gas above the buildup and joining zone.

Furthermore, the length of the blade elements parallel to the axis of rotation of the gas conduction device corresponds advantageously to at least the length of the edge of the overflow tank and/or the buildup and joining zone and/or the support region between the construction platform and the overflow tank against which at least one blade element abuts at least temporarily. Such a design of the length of the blade element or of the gas conduction device affords, in turn, a reliable shielding with respect to the flow of gas passing above the buildup and joining zone. In addition, the blade elements of the gas conduction device can be arranged with respect to one another in such a way that, when a blade element abuts an edge of the overflow tank and/or the buildup and joining zone and/or the support region between the construction platform and the overflow tank, excess material from the region of the construction platform is brought by means of the coater into a collecting region between the abutting blade element and the non-abutting blade element and is transported by means of a rotational movement of the gas conduction device in the direction opposite to the construction platform into the overflow tank. Such an advantageous design of the gas conduction device makes possible an uninterrupted and continuous operation of the method. Besides a reliable shielding by the gas conduction device, the rotational movement of the gas conduction device that is initiated by the coater brings the excess component material into the overflow tank.

In further advantageous embodiments of the device according to the invention, the gas conduction device comprises at least one wall element, with the wall element being arranged with a first end on a side of the coater that faces the construction chamber and with a second end, which lies opposite to the first end, being guided in a guide in at least one side wall of the construction chamber and with the guide being arranged in the region of the buildup and joining zone of the construction platform above the latter and dropping off at the end of the buildup and joining zone in the direction of the overflow tank. In this embodiment of the gas conduction device, too, the gas conduction device serves for optimization of the guidance of the flow in the construction chamber of the device according to the invention, with the overflow tank and/or the coater, provided that the latter is situated in the region above the overflow tank, being reliably shielded, from the flow of gas above the buildup and joining zone. In addition, the guidance of the wall element above the region of the buildup and joining zone ensures that the wall element does not come into contact with the buildup and joining zone or with the powder bed there. Since the guide drops off at the end of the buildup and joining zone in the direction of the overflow tank, the flow of gas is isolated by the wall element from the overflow tank. Because the wall element is arranged on the side of the coater that faces the construction chamber, it, too, is shielded at least temporarily from the mentioned flow of gas. In this way, in turn, a marked improvement in the homogeneity of the flow direction and the flow rate of the flow of gas above the buildup and joining zone is ensured. This leads to a marked improvement in the removal of process by-products by the flow of gas. The consequence of this is a corresponding improvement in the quality of the three-dimensional objects being manufactured or of the corresponding repairs of the three-dimensional objects by means of additive methods. In this case, it is possible for the wall element to be designed to be flexible or inflexible. In addition, there exists the possibility of arranging the wall element above a pivot joint or hinge joint on the coater. As a result of these measures, the wall element can be guided in the guide in a straightforward manner, with the wall element—as already mentioned above—adopting different inclinations with respect to the buildup and joining zone in different positions of travel of the coater. Furthermore, there exists the possibility that the guide of the wall element is designed so as to run above the flow of gas in the region of the buildup and joining zone of the construction platform. As a result of the at least temporary delimitation of the flow chamber by the wall element, it is possible to increase the flow rate of the gas. The increase in the flow rate brings about, in turn, an improved removal of the mentioned process by-products.

The construction chamber of the device described above is usually a process chamber for carrying out the additive manufacture or repair method. The three-dimensional object to be manufactured or repaired can be a component or a component assembly of an aircraft engine, in particular of a compressor or a turbine. The material used can be in the form of a powder, liquid, or paste and usually is composed of a metal, a metal alloy, a ceramic or plastic, or a mixture thereof.

A second aspect of the invention relates to a method for the manufacture or repair of a three-dimensional object, in which the method according to the invention comprises at least the following steps: a) deposition of at least one powdered material layer by layer by means of at least one coater onto at least one construction platform in the region of a buildup and joining zone, with the coater being movable in relation to the construction platform; b) local melting and/or sintering of the material layer by layer by supplying energy by means of at least one high-energy beam in the region of the buildup and joining zone in order to form a layer of the object; c) lowering of the construction platform layer by layer by a predefined layer thickness; and d) repetition of the steps a) to c) until fabrication of the object is complete. In the process, at least one gas conduction device is moved by means of the coater or by means of a drive unit into a closed position for an at least temporary shielding of the coater and/or of an overflow tank for excess material from a flow of gas passing at least above the buildup and joining zone. The closed position of the gas conduction device and thus the shielding of the coater and/or of the overflow tank associated therewith from the flow of gas above the buildup and joining zone results in a marked improvement in the homogeneity of the flow direction and flow rate of the gas flow. As a result of this, in turn, an improved removal of process by-products formed during the additive fabrication method is ensured, so that, in turn, there results a marked improvement in the quality of the three-dimensional objects to be manufactured or of the three-dimensional objects to be repaired.

In advantageous embodiments of the method according to the invention, the gas conduction device is designed in the form of a blade wheel having at least three blade elements and is arranged in a rotatable manner in a region above the overflow tank of the device in such a way that, when the coater travels over the gas conduction device, the coater comes into contact with at least a portion of the blade elements and causes the gas conduction device to move, or in such a way that the gas conduction device comprises at least one wall element, with the wall element being arranged with a first end on a side of the coater that faces the construction chamber of the device and with a second end, which lies opposite to the first end, being guided in a guide in at least one side wall of the construction chamber and with the guide being arranged in the region of the buildup and joining zone of the construction platform above the latter and dropping off at the end of the buildup and joining zone in the direction of the overflow tank. These embodiments and arrangements of the gas conduction device, which is designed to be movable, enables the overflow tank and the coater, especially when the latter is situated in the region above the overflow tank, to be reliably shielded from the flow of gas above the buildup and joining zone. The at least temporary shielding of the flow of gas brings about, in turn, an improvement in the homogeneity of the flow direction and of the flow rate of the gas flow above the buildup and joining zone.

The features and advantages ensuing from the use of the device according to the first aspect of the invention may be taken from the descriptions of the first aspect of the invention, whereby advantageous embodiments of the first aspect of the invention are to be regarded as advantageous embodiments of the second aspect of the invention and vice versa.

A third aspect of the invention relates to a gas conduction device for use in a device for the additive manufacture or repair of a three-dimensional object, wherein the gas conduction device is designed in the form of a blade wheel having at least three blade elements and is arranged in a rotatable manner in a region above the overflow tank of the device in such a way that, when a coater of the device travels over the gas conduction device, the coater comes into contact with at least a portion of the blade elements and causes the gas conduction device to move, so that the latter remains at least temporarily in a closed position. It is also possible for the gas conduction device to be rotated by means of a drive unit—without any contact with the coater. The embodiment of the gas conduction device in the form of a blade wheel and the arrangement thereof in a region above the overflow tank enables the latter to be shielded reliably from a flow of gas over at least a portion of the blade elements, this gas flow being formed, in particular, above a build-up and joining zone. In turn, owing to the shielding, any overflow or dropping of the flow of gas into the overflow tank is minimized. In this way, the flow direction and the flow rate of the gas flow can be optimized, so that process by-products, in particular, can be removed reliably from the device. In addition, there exists the possibility that at least one blade element is designed in such a way that one end of the blade element abuts an edge of the overflow tank and/or the buildup and joining zone and/or a support region between the construction platform and the overflow tank and, in the process, at least the overflow tank is shielded from the flow of gas by means of the abutting blade element and the at least one, non-abutting blade element. The possibility of abutting one of the blade elements at the edge of the overflow tank and/or the buildup and joining zone and/or the mentioned support region reliably prevents the flow of gas from flowing off into the overflow tank, so that, in turn, the homogeneity of the flow direction and the flow rate of the flow of gas above the buildup and joining zone is markedly improved. Furthermore, there exists the possibility that the gas conduction device comprises three blade elements, with the blade elements being arranged at an angle of 120° with respect to one another. In addition, there exists the possibility that at least one blade element is designed to be heavier than the other blade elements and/or that an axis of rotation of the gas conduction device is arranged eccentrically with respect to an intersection of the blade elements. The latter-mentioned measure ensures that the respective blade elements stably abut the edge of the overflow tank, the buildup and joining zone, or the mentioned support region between the construction platform and the overflow tank and reliably shield the flow of gas above the buildup and joining zone. Furthermore, the length of the blade elements parallel to the axis of rotation of the gas conduction device corresponds advantageously to at least the length of the edge of the overflow tank and/or the buildup and joining zone and/or the support region between the construction platform and the overflow tank against which at least one blade element abuts at least temporarily. Such a design of the length of the blade element or of the gas conduction device affords, in turn, a reliable shielding with respect to the flow of gas passing above the buildup and joining zone. In addition, the blade elements of the gas conduction device can be arranged with respect to one another in such a way that, when a blade element abuts an edge of the overflow tank and/or the buildup and joining zone and/or the support region between the construction platform and the overflow tank, excess material from the region of the construction platform is brought by means of the coater into a collecting region between the abutting blade element and the non-abutting blade element and is transported by means of a rotational movement of the gas conduction device in the direction opposite to the construction platform into the overflow tank. Such an advantageous design of the gas conduction device makes possible an uninterrupted and continuous operation of the method. Besides a reliable shielding by the gas conduction device, the rotational movement of the gas conduction device that is initiated by the coater or the drive unit brings the excess component material into the overflow tank.

The features and advantages ensuing from the use of the device according to the first aspect of the invention may be taken from the descriptions of the first aspect of the invention, whereby advantageous embodiments of the first aspect of the invention are to be regarded as advantageous embodiments of the third aspect of the invention as well as the second aspect of the invention and vice versa.

A fourth aspect of the invention relates to a gas conduction device for use in a device for the additive manufacture or repair of a three-dimensional object, wherein the gas conduction device comprises at least one wall element, with the wall element being arranged with a first end on a side of the coater of the device that faces a construction chamber and with a second end, which lies opposite to the first end, being guided in a guide formed in at least one side wall of the construction chamber and with the guide being arranged in the region of a buildup and joining zone of a construction platform above the latter and dropping off at the end of the buildup and joining zone in the direction of the overflow tank. It is also possible by way of this gas conduction device according to the invention to reliably shield the flow of gas above the buildup and joining zone at least temporarily from the overflow tank and the coater. In this way, in turn, the flow behavior, in particular the flow direction and the flow rate of the gas flow, is optimized, so that detrimental process by-products can be removed from the construction chamber by means of the flow of gas in a straightforward manner. In addition, the guidance of the wall element above the region of the buildup and joining zone ensures that the wall element does not come into contact with the buildup and joining zone or with the powder bed there. Since the guide drops off at the end of the buildup and joining zone in the direction of the overflow tank, the flow of gas is isolated opposite the overflow tank by the wall element. Because the wall element is arranged on the side of the coater that faces the construction chamber, it, too, is shielded at least temporarily from the mentioned flow of gas. In this way, in turn, a marked improvement in the homogeneity of the flow direction and the flow rate of the gas flow above the buildup and joining zone is ensured. This leads to a marked improvement in the removal of process by-products by the flow of gas. The result is a corresponding improvement in the quality of three-dimensional objects to be manufactured or of the corresponding repairs of three-dimensional objects by means of additive methods. In this case, it is possible for the wall element to be designed to be flexible or inflexible. In addition, there exists the possibility of arranging the wall element above a pivot joint or hinge joint on the coater. As a result of these measures, the wall element can be guided in the guide in a straightforward manner, with the wall element—as already mentioned above—adopting different inclinations with respect to the buildup and joining zone in different positions of travel of the coater. Furthermore, there exists the possibility that the guide of the wall element is designed so as to run above the flow of gas in the region of the buildup and joining zone of the construction platform. As a result of the at least temporary delimitation of the flow chamber by the wall element, it is possible to increase the flow rate of the gas. The increase in the flow rate brings about, in turn, an improved removal of the mentioned process by-products.

The features and advantages ensuing from the use of the device according to the first aspect of the invention may be taken from the descriptions of the first aspect of the invention, whereby advantageous embodiments of the first aspect of the invention are to be regarded as advantageous embodiments of the fourth aspect of the invention as well as the third aspect of the invention and the second aspect of the invention, and vice versa.

BRIEF DESCRIPTION OF THE DRAWING FIGURES

Further features of the invention ensue from the claims and the exemplary embodiments as well as on the basis of the drawings. The features and combinations of features mentioned in the description as well as the features and combinations of features mentioned below in the exemplary embodiments can be used not only in the respectively given combinations, but also in other combinations, without departing from the scope of the invention.

Shown are.

DETAILED DESCRIPTION OF THE INVENTION

Figure 1:
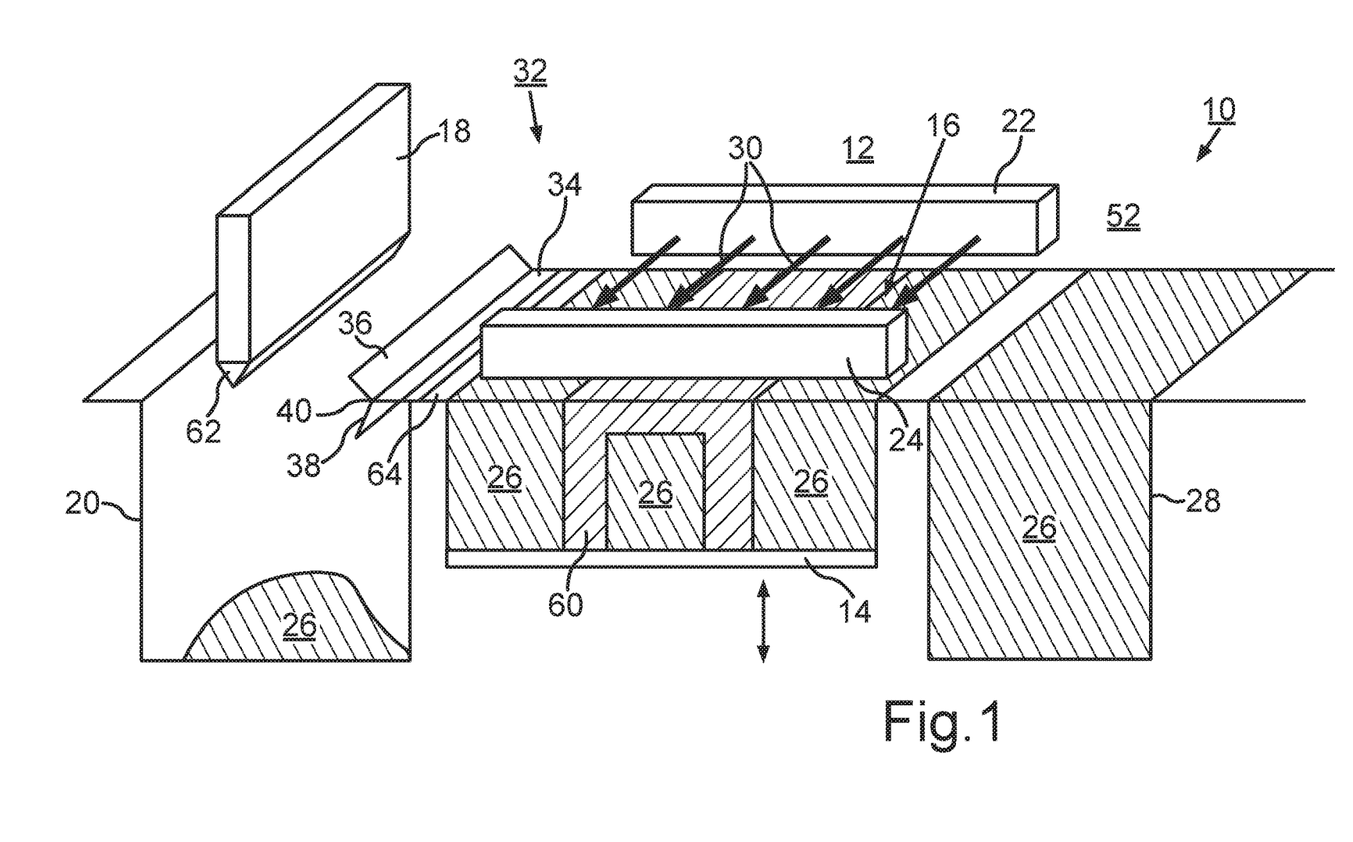
FIG. 1 is a schematic, partly cut-away illustration of a device according to the invention for the manufacture or repair of a three-dimensional object according to a first embodiment.

FIG. 1 shows a schematically depicted device 10 for the additive manufacture or additive repair of a three-dimensional object 60 according to a first embodiment. The three-dimensional object 60 can be, for example, a component of a turbomachine. In particular, it can be a component of a turbine or of a compressor of an aircraft engine. In this case, the device 10 has a coater 18 for the deposition of at least one powder layer of a component material 26 on at least one buildup and joining zone 16 of a construction platform 14 that can be lowered. The coater 18 can travel by means of a travel unit (not illustrated) inside of a construction chamber 12 of the device 10. In this case, the movement of the coater 18 occurs above and along the construction platform 14 or the buildup and joining zone 16, so that a uniform deposition of the powdered component material 26 layer by layer on the construction platform 14 is possible. The component material or the material 26 is in the form of a powder in the exemplary embodiment described. In particular, it is a powder composed of a metal or metal alloy. However, there is also the possibility that, in other exemplary embodiments, other materials, such as, for example, ceramic or plastic or a mixture of metal, metal alloy, ceramic, or plastic, are used. In addition, there also exists the possibility that the material is not in the form of a powder, but rather in the form of a paste or fluid. If need be, when such component materials are used, other methods of deposition by means of a coater are employed. The component material 26 is loaded in a storage hopper 28 and delivered from it to the coater 18. For a uniform deposition of powder onto the buildup and joining zone 16, the coater 18 has a doctor blade 62.

The device 10 further comprises at least one radiation source for producing a high-energy beam (not illustrated), by means of which the powder layer in the region of the buildup and joining zone 16 can be melted and/or sintered locally with creation of a melt bath to form a component layer. In the exemplary embodiment illustrated, a laser beam is used. However, it is also conceivable to use electron beams or, besides high-energy beams, also light beams, in particular UV light beams. Furthermore, the device 10 comprises an inflow nozzle 22. Via the inflow nozzle 22, a process gas is fed into the construction chamber 12 or the process chamber of the device 10. The process gas can be, in particular, a protective or inert gas. The inflow nozzle 22 is designed as an inflow manifold with a plurality of inlet openings (not illustrated) and is arranged on a laterally formed side wall or back wall 52 of the construction chamber 12. In addition, the device 10 comprises at least one suction outlet nozzle 24 for suctioning off the process gas. The outlet nozzle 24 is designed as a suction manifold with a plurality of outlet orifices (not illustrated). Created between the inlet nozzle 22 and the outlet nozzle 24 is a gas flow 30 that passes at least partially over the construction platform 14 and the buildup and joining zone 16. In this case, the inlet nozzle 22 and the outlet nozzle 24 are arranged at roughly the same height above the construction platform 14 and the buildup and joining zone 16.

It can be further seen that an overflow tank 20 for receiving excess material 26 is arranged next to the construction platform 14. In this case, the excess material 26 is brought by means of the coater 18 or the doctor blade 62 arranged on the coater 18 from the construction platform 14 into the overflow tank 20. A support region 64 is formed between the buildup and joining zone 16 and the overflow tank 20.

A gas-conducting device 32 is arranged movably inside of the construction chamber 12 in such a way that the coater 18 and/or the overflow tank 20, in a closed position of the gas conduction device 32, are or is shielded at least temporarily from the gas flow 30. The movement of the gas conduction device occurs by means of the coater 18, as described in detail in FIGS. 2a-2d. It can be seen that, in the first exemplary embodiment illustrated, the gas conduction device 32 is designed in the form of a blade wheel having three blade elements 34, 36, 38. In this case, the blade wheel is arranged in a rotatable manner above the overflow tank 20 in such a way that, when the coater 18 travels over the gas conduction device 32, it comes into contact with at least a portion of the blade elements 34, 36, 38 and causes the gas conduction device 32 to move in such a way that it remains in the closed position. In this case, "closed position" is understood to mean the position of the gas conduction device 32 in which the flow of gas is shielded at least temporarily from the overflow tank 20 and/or the coater 18. The gas conduction device 32 is designed in terms of dimensions in such a way that the gas flow 30 is prevented from dropping into the overflow tank 20 and from flowing against or around the coater 18. An axis of rotation 40 of the gas conduction device 32 extends roughly perpendicular to the direction of movement of the coater 18.

Figure 2A:
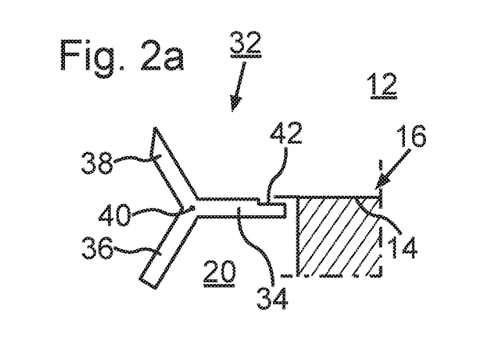
FIGS. 2a to 2d show a schematic illustration of the functional operation of the device according to FIG. 1.
Figure 2B:
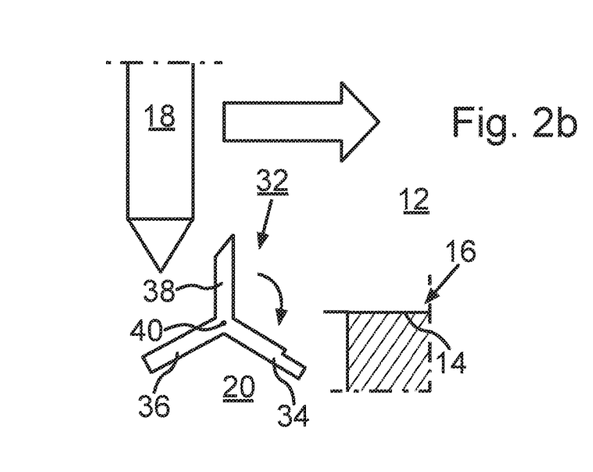
Figure 2C:
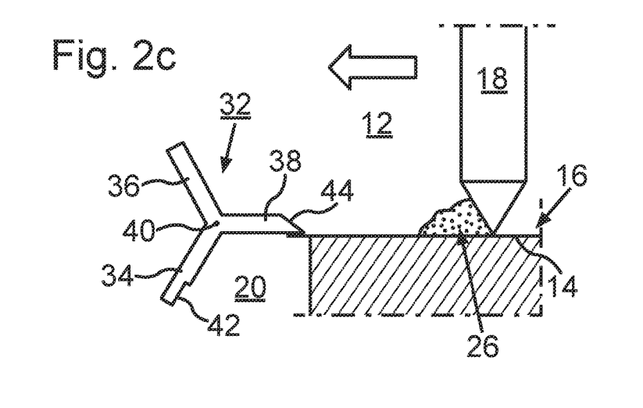
Figure 2D:
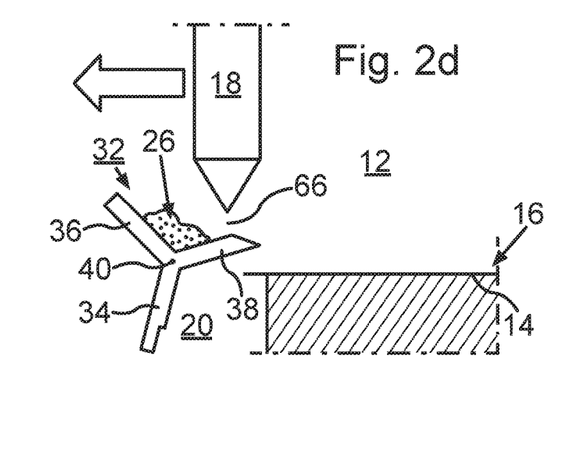

FIGS. 2a to 2d show a schematic illustration of the functional operation of the device 10 according to FIG. 1. In this case, FIG. 2a shows the gas conduction device 32 in a first position, which ensues during the layer-by-layer and local melting and/or sintering of the material 26 by supplying energy by means of at least one high-energy beam (not illustrated) in the region of the buildup and joining zone 16 for formation of a layer of the object 60. The coater 18 is situated above the overflow tank 20 or, in the illustration, to the left of the gas conduction device 32. It can be seen that, in this position, the gas conduction device 32 abuts with its blade element 34 an edge of the overflow tank 20. In this case, a respective end of the blade element 34 has a recess 42, in which the edge of the overflow tank 20 abuts. The abutting blade element 34 and the non-abutting blade element 36 create a shielding of the overflow tank 20 against the flow of gas above the buildup and joining zone 16. In this position, the two blade elements 34, 36 form a first closed position. If the melting or sintering of a layer of the object 60 is complete, then the coater 18 travels from a position above the overflow tank 20 in the direction of the construction chamber 12 or the construction platform 14. The movement of the coater 18 is indicated by means of the arrow. During this process, the coater 18 and, in particular, the doctor blade 62 of the coater 18 comes into contact with the non-abutting blade element 36 and thereby rotates the gas conduction device 32 in the clockwise direction (compare FIG. 2b). This rotation is terminated by a stopping of the blade element 38—as shown in FIG. 2c. In this position, the blade element 38 then lies on the edge of the overflow tank 20. In this position, the two blade elements 38, 36 form a second closed position (compare FIG. 2c). The abutting end of the blade element 38 can, in addition, have a bevel 44 for improving the collection of excess material 26. The gas conduction device 32 remains initially in this position. If the coater 18 then travels away from the construction platform 14, carrying excess material powder 26 with it, once again in the direction of the overflow tank 20, then the excess material powder 26 is brought into a collecting region 66 between the abutting blade element 38 and the non-abutting blade element 36 and is transported by means of a rotational movement of the gas conduction device 32 in the direction opposite to the construction platform 14 into the overflow tank 20 (compare also FIG. 2d). The rotational movement of the gas conduction device 32 occurs, in turn, by contact with the coater 18 and takes place—as illustrated in FIG. 2d—in the counterclockwise direction. This counterclockwise rotation is terminated, in turn, by a stopping of the blade element 34 beneath an edge of the overflow tank 20. The gas conduction device 32 is once again situated in the first closed position and is rotated only by the advance of the coater 18. No further drive is necessary. It is to be noted further that the non-abutting blade element 36 is designed to be shorter, on the one hand, than the other blade elements 34, 38 and also has a greater weight. In this way, a stable position of the gas conduction device, as illustrated in FIGS. 2a and 2c, is possible.

Figure 3A:
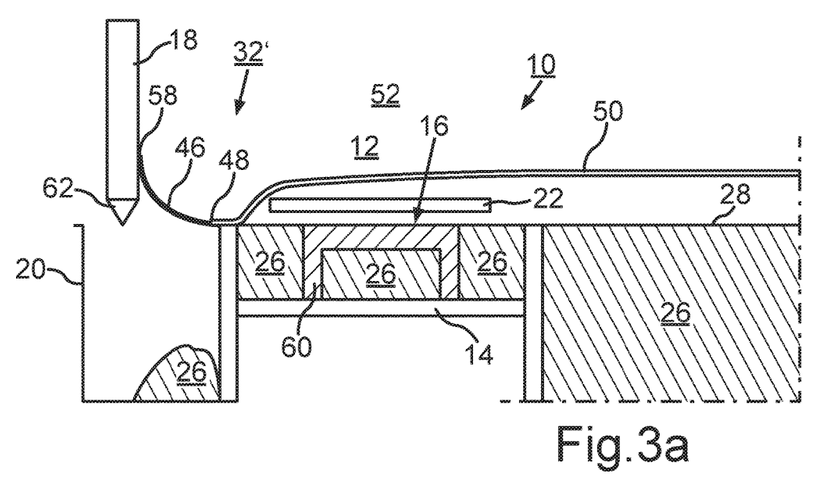
FIG. 3a is a schematic sectional illustration of a device according to the invention for the manufacture or repair of a three-dimensional object according to a second embodiment with a gas conduction device in a first position of travel.

FIG. 3a shows a schematic illustration of a device 10 for the manufacture or repair of a three-dimensional object 60 according to a second embodiment with a gas conduction device 32' in a first position of travel. It can be seen that, according to this embodiment, a gas conduction device 32' comprises a wall element 46, with the wall element 46 being arranged with a first end on a side of the coater that faces the construction chamber 12 so as to rotate via a pivot joint/hinge joint 58. With an end that lies opposite this end, the wall element 46 is guided in a guide 50 via a pin 48. The guide 50 is, in turn, formed in a side wall 52 of the construction chamber 12. It can be seen that the guide 50 is arranged in the region of the buildup and joining zone 16 above the latter and drops off at the end of the buildup and joining zone 16 in the direction of the overflow tank 20. In addition, it becomes clear that, according to this exemplary embodiment, the wall element 46 is designed to be flexible. The wall element 46 of the gas conduction device 32' is moved along the guide 50 by means of the movement of the coater 18. In addition, the guide 50 is arranged in the region of the buildup and joining zone 16 of the construction platform 14 above the gas flow 30 or above the inflow nozzle 22 and the outlet nozzle 24 (not illustrated). When this is viewed together with FIG. 3b, which illustrates the wall element 46 in a second position of travel, it becomes clear that, when the coater 18 moves in the direction of the overflow tank 20, the second end of the wall element 46, which is guided in the guide 50 by means of the pin 48, is lowered in the direction of the overflow tank 20 and thereby shields the overflow tank 20 and the coater 18 from the gas flow 30 above the buildup and joining zone 16. The gas conduction device 32' is situated in a closed position. In this case, "closed position" is understood to mean the position of the gas conduction device 32' in which the flow of gas is shielded at least temporarily from the overflow tank 20 and the coater 18. When the coater moves in the direction of the construction platform 14, the second end of the wall element 46 is lifted or travels above the buildup and joining zone 16 by means of the guide 50, so that, when the buildup and joining zone 16 is coated, the wall element 46 does not come into contact with the powder bed of the material 26.

Figure 3B:
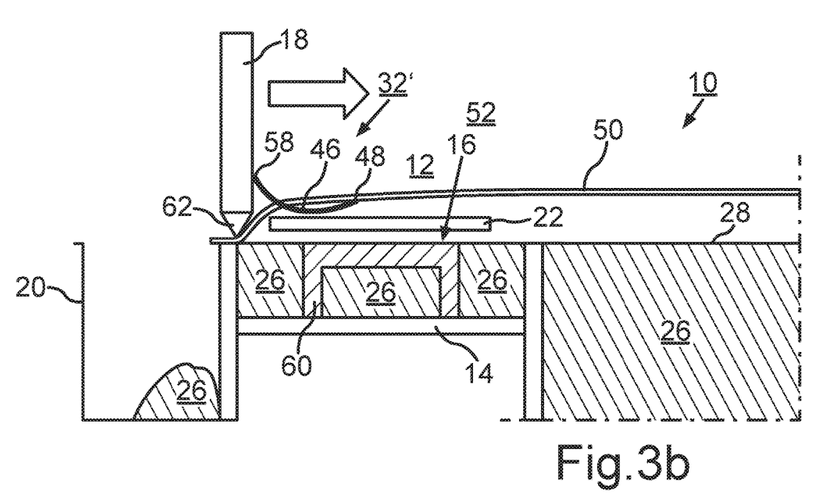
FIG. 3b is a schematic sectional illustration of the device of the invention according to FIG. 3a with the gas conduction device in a second position of travel.
Figure 4:
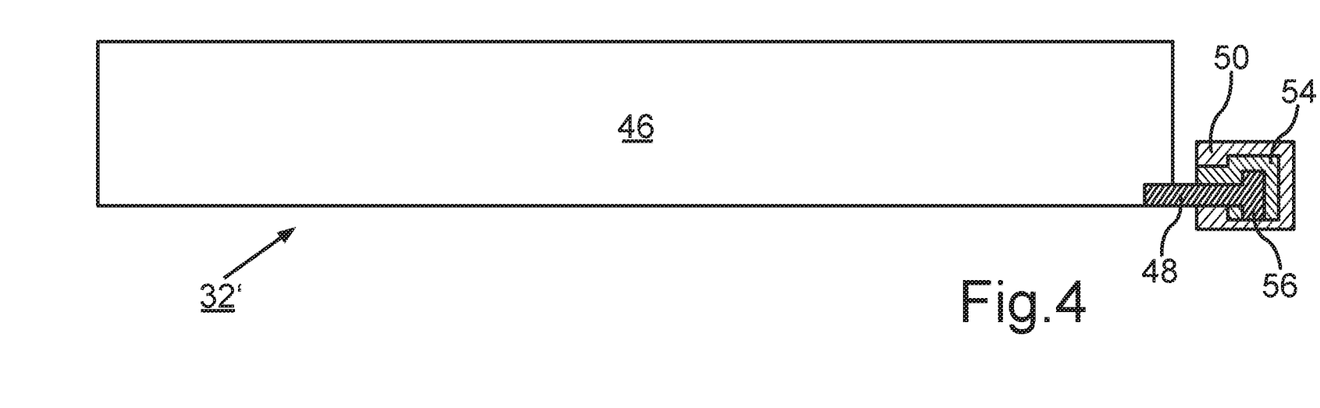
FIG. 4 is a schematic, partially cut-away illustration of a wall element of the device according to FIGS. 3a and 3b.

FIG. 4 shows a schematically, partially cut-away illustration of the wall element 46 of the device 10 according to FIGS. 3a and 3b. The design of the pin 48 at the second end of the wall element 46 can be seen. In this case, the pin 48 has, at its end that lies opposite the wall element, a thickened portion 56, which comes to rest in a corresponding recess 54 of the guide 50 and is guided therein. In this way, a reliable guidance of the wall element 46 in the guide 50 is ensured.

What is claimed is:

1. A device for the manufacture or repair of a three-dimensional object, comprising:
   at least one construction chamber for a successive solidification of at least one solidifiable material layer by layer in predefined regions for layer-by-layer buildup of the three-dimensional object or for layer-by-layer repair of individual regions of the three-dimensional object inside of the construction chamber;
   at least one coater that can travel for deposition of the material on at least one buildup and joining zone of a construction platform formed in the construction chamber;
   at least one inflow nozzle and at least one suction outlet nozzle for a process gas, with the inflow nozzle and the outlet nozzle being arranged in such a way that a gas flow that passes at least partially above the buildup and joining zone is created; and
   at least one overflow tank,
   wherein
   at least one gas conduction device is movably arranged inside of the construction chamber in such a way that the coater and/or, in a closed position of the gas conduction device, the overflow tank is at least temporarily shielded from the gas flow.

2. The device according to claim 1, wherein the movement of the gas conduction device occurs by the coater or by a drive unit.

3. The device according to claim 1, wherein the gas conduction device is a blade wheel having at least three blade elements and is arranged in a region above the overflow tank so as to rotate by a drive unit or is arranged in a region above the overflow tank to rotate in such a manner that, when the coater travels over the gas conduction device, the coater comes into contact with at least a portion of the blade elements and causes the gas conduction device to move.

4. The device according to claim 3, wherein at least one blade element is configured with one end of the blade element abutting an edge of the overflow tank and/or the buildup and joining zone and/or a support region between the construction platform and the overflow tank and, in the process, at least the overflow tank is shielded from the gas flow by the abutting blade element and the at least one, non-abutting blade element.

5. The device according to claim 3, wherein the gas conduction device comprises at least three blade elements, with the blade elements being arranged at an angle of 120° with respect to one another.

6. The device according to claim 3, wherein one blade element of the at least three blade elements is heavier than the other blade elements and/or an axis of rotation of the gas conduction device is arranged eccentrically with respect to an intersection of the at least three blade elements.

7. The device according to claim 3, wherein the length of the blade elements parallel to the axis of rotation of the gas conduction device corresponds advantageously to at least the length of an edge of the overflow tank and/or the buildup and joining zone and/or a support region between the construction platform and the overflow tank at which at least one blade element abuts at least temporarily.

8. The device according to claim 3, wherein the blade elements are arranged with respect to one another, when a blade element abuts the edge of the overflow tank and/or the buildup and joining zone and/or a support region between the construction platform and the overflow tank, excess material is brought from the region of the construction platform by the coater into a collecting region between the abutting blade element and the non-abutting blade element and is transported by a rotational movement of the gas conduction device in the direction opposite to the construction platform into the overflow tank.

9. The device according to claim 1, wherein the gas conduction device comprises at least one wall element, with the wall element being configured with a first end on a side of the coater that faces the construction chamber and with a second end, which lies opposite to the first end, being guided in a guide formed in at least one side wall of the construction chamber and with the guide being arranged in the region of the buildup and joining zone of the construction platform above the latter and dropping off at the end of the buildup and joining zone in the direction of the overflow tank.

10. The device according to claim 9, wherein the wall element is configured to be flexible or inflexible or in that the wall element is arranged via a pivot joint or hinge joint on the coater.

11. The device according to claim 9, wherein the guide is passes above the gas flow in the region of the buildup and joining zone of the construction platform.

12. A gas conduction device for use in a device for the additive manufacture or repair of a three-dimensional object, comprising:

a gas conduction device in the form of a blade wheel having at least three blade elements and that can be rotated by a drive unit or is arranged in a rotatable manner in a region above the overflow tank of the device and is configured so that, when the coater of the device travels over the gas conduction device, the coater comes into contact with at least a portion of the blade elements and causes the gas conduction device to move.

13. A gas conduction device for use in a device for the additive manufacture or repair of a three-dimensional object, comprising:

a gas conduction device comprising at least one wall element, with the wall element being configured with a first end on a side of the coater of the device that faces a construction chamber of the device and with a second end, which lies opposite to the first end, being guided in a guide formed in at least one side wall of the construction chamber and with the guide being arranged in the region of a buildup and joining zone of a construction platform above the latter and dropping off at the end of the buildup and joining zone in the direction of an overflow tank.

* * * * *